US008655840B2

(12) United States Patent
Simelius

(10) Patent No.: US 8,655,840 B2

(45) Date of Patent: Feb. 18, 2014

(54) METHOD, APPARATUS AND COMPUTER PROGRAM PRODUCT FOR SUB-FILE LEVEL SYNCHRONIZATION

(75) Inventor: Kim Kristian Simelius, Tampere (FI)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 12/327,507

(22) Filed: Dec. 3, 2008

(65) Prior Publication Data

US 2010/0138387 A1 Jun. 3, 2010

(51) Int. Cl.
*G06F 17/30* (2006.01)

(52) U.S. Cl.
USPC .......................................................... 707/624

(58) Field of Classification Search
USPC ........... 707/624, 609, 610, 695, 703; 711/162
See application file for complete search history.

(56) References Cited

U.S. PATENT DOCUMENTS

| | | | | |
|---|---|---|---|---|
| 5,659,614 | A | 8/1997 | Bailey, III | |
| 6,847,984 | B1 * | 1/2005 | Midgley et al. | 1/1 |
| 7,386,575 | B2 | 6/2008 | Bashant et al. | |
| 7,523,276 | B1 * | 4/2009 | Shankar | 711/162 |
| 7,603,391 | B1 * | 10/2009 | Federwisch et al. | 1/1 |
| 7,644,113 | B2 * | 1/2010 | Midgley et al. | 707/999.204 |
| 7,657,517 | B2 * | 2/2010 | Brown et al. | 707/999.004 |
| 2002/0029227 | A1 * | 3/2002 | Multer et al. | 707/203 |
| 2002/0120785 | A1 | 8/2002 | Somalwar et al. | |
| 2002/0174139 | A1 * | 11/2002 | Midgley et al. | 707/204 |
| 2003/0056139 | A1 | 3/2003 | Murray et al. | |
| 2003/0074378 | A1 * | 4/2003 | Midgley et al. | 707/204 |
| 2005/0187902 | A1 | 8/2005 | Carpentier et al. | |
| 2006/0112150 | A1 * | 5/2006 | Brown et al. | 707/201 |
| 2007/0208783 | A1 * | 9/2007 | Midgley et al. | 707/201 |
| 2008/0201362 | A1 | 8/2008 | Multer et al. | |

FOREIGN PATENT DOCUMENTS

| | | | |
|---|---|---|---|
| EP | 1 152 352 | A2 | 7/2001 |
| WO | WO 01/98951 | A1 | 12/2001 |

OTHER PUBLICATIONS

International Search Report and Written Opinion for Application No. PCT/IB2009/007612 dated Apr. 1, 2010.

*Content Synchronization T-110.5120 Next Generation Wireless Networks*, available at http://www.tml.tkk.fi/Opinnot/T-110.5120/2006/slides/contentSync_final.pdt, printed Dec. 3, 2008, 33 pages.

Ardizzone, E., et al., *Content-Based indexing of MPEG-4 video on Relationship DBMS*, available at http://ftp.informatik.rwth-aachen.de/Publications/CEUR-WS/Vol-43/p7.pdf, printed Dec. 3, 2008, 6 pages.

*Intellisync File Sync, A Detailed Guide to Functionality*, available at http://www.ecommet.co.uk/lib/Intellisync_File_Sync_Functionality_Overview_e.pdf, printed Dec. 3, 2008, 14 pages.

*Mobiliti Network / Unplugged, Best Practices Guide*, available at ftp://ftp.mobiliti.com/pub/docs/40/BestPracticesGuide40.pdf, printed Dec. 3, 2008, 23 pages.

(Continued)

*Primary Examiner* — Hung T Vy

(74) *Attorney, Agent, or Firm* — Alston & Bird LLP

(57) ABSTRACT

An apparatus for providing sub-file level synchronization may include a processor configured to receive an indication of a change to a portion of a file, generate a file identifier in response to the receipt of the indication, the file identifier including a sub-file identification indicative of the portion of the file, and enable synchronization of the portion of the file based on the sub-file identification. A corresponding method and computer program product are also provided.

32 Claims, 5 Drawing Sheets

Receiving a file identifier including a sub-file identification indicative of a portion of a file, the sub-file identification being previously generated responsive to a change in the portion of the file — 300

Determining whether a local version of the file is updated with respect to the change — 310

Enabling synchronization of the portion of the file based on a result of the determining — 320

Mapping a local file identifier of the local version of the file to the received file identifier — 330

(56) References Cited

OTHER PUBLICATIONS

*Mobiliti—Incremental Backup and Synchronization*, available at http://www.mobiliti.com/deltatechnology.html, printed Dec. 3, 2008, 2 pages.

Chervenak, A. L., et al., *Protecting File Systems: A Survey of Backup Techniques*, available at http://pdb.eng.uiowa.edu/~achiang/jclub/summer03/Chervenak_PFSASBT.pdf, printed Dec. 3, 2008, 15 pages.

* cited by examiner

METHOD, APPARATUS AND COMPUTER PROGRAM PRODUCT FOR SUB-FILE LEVEL SYNCHRONIZATION

TECHNOLOGICAL FIELD

Embodiments of the present invention relate generally to content synchronization technology and, more particularly, relate to an apparatus, method and a computer program product for synchronization of individual files.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the synchronization of content on multiple devices. In this regard, given the ability for modern electronic devices to create and modify content, and also to distribute or share content, it is not uncommon for multiple copies of a particular content item to be stored at respective different locations within a network. In some cases, it may be desirable to ensure that the various different files or copies of a particular content item remain updated or synchronized with respect to each other. Accordingly, synchronization techniques have been developed to provide for data synchronization.

Numerous different protocols have been developed to handle synchronization. Some of these protocols allow what is referred to as “fast sync”, in which only changed files are synchronized instead of synchronizing all files on devices being synchronized. SyncML and ActiveSync are examples of such protocols. In order to accomplish fast synchronization, files at one device (e.g., the serving device) are typically mapped to files at the other device (e.g., the client device), for example, by linking identifiers of the files on both devices to each other. This enables, for each identified file, an indication to be provided as to whether the file has been changed and should therefore be synchronized. If a file requires synchronization, an updated copy of the file to be synchronized may be transferred from one device to the other. However, even in the fast sync context, synchronizing changed files can consume large amounts of time and bandwidth (particularly for large files).

Accordingly, it may be desirable to provide an improved mechanism by which to provide content synchronization.

BRIEF SUMMARY

A method, apparatus and computer program product are therefore provided that may enable sub-file level mapping in relation to content items that are candidates for synchronization. Thus, for example, it may be possible to synchronize portions of files that have been changed rather than being limited to complete file synchronization. In some embodiments, file identifiers may further include sub-file identifications to enable mapping with respect to file versions at different devices to track updating in relation to changed portions of particular files. This sub-file mapping may be employed between devices to indicate whether changes to a specific portion of a file have been made in the corresponding specific portion of the file at a device. If the specific portion of the file on one of the devices has not yet been changed, embodiments of the present invention may provide for the synchronization of the specific portion without requiring synchronization of the entire file.

In an exemplary embodiment, a method of providing sub-file level synchronization is provided. The method may include receiving an indication of a change to a portion of a file, generating, at a device capable of storing files, a file identifier in response to the receipt of the indication in which the file identifier includes a sub-file identification indicative of the portion of the file, and enabling synchronization of the portion of the file based on the sub-file identification.

In another exemplary embodiment, a computer program product for providing sub-file level synchronization is provided. The computer program product includes at least one computer-readable storage medium having computer-executable program code instructions stored therein. The computer-executable program code instructions may include program code instructions for receiving an indication of a change to a portion of a file, generating a file identifier in response to the receipt of the indication in which the file identifier includes a sub-file identification indicative of the portion of the file, and enabling synchronization of the portion of the file based on the sub-file identification.

In another exemplary embodiment, an apparatus for providing sub-file level synchronization is provided. The apparatus may include a processor. The processor may be configured to receive an indication of a change to a portion of a file, generate a file identifier in response to the receipt of the indication in which the file identifier includes a sub-file identification indicative of the portion of the file, and enable synchronization of the portion of the file based on the sub-file identification.

In an exemplary embodiment, a method of providing sub-file level synchronization is provided. The method may include receiving a file identifier including a sub-file identification indicative of a portion of a file changed at another device in which the file changed at the other device corresponds to a locally stored file, receiving the portion of the file changed at the other device, and enabling synchronization of the locally stored file based on the received portion of the file changed.

In another exemplary embodiment, a computer program product for providing sub-file level synchronization is provided. The computer program product includes at least one computer-readable storage medium having computer-executable program code instructions stored therein. The computer-executable program code instructions may include program code instructions for receiving a file identifier including a sub-file identification indicative of a portion of a file changed at another device in which the file changed at the other device corresponds to a locally stored file, receiving the portion of the file changed at the other device, and enabling synchronization of the locally stored file based on the received portion of the file changed.

In another exemplary embodiment, an apparatus for providing sub-file level synchronization is provided. The apparatus may include a processor. The processor may be configured to receive a file identifier including a sub-file identification indicative of a portion of a file changed at another device in which the file changed at the other device corresponds to a locally stored file, receive the portion of the file changed at the other device, and enable synchronization of the locally stored file based on the received portion of the file changed.

Accordingly, embodiments of the present invention may enable improved capabilities with respect to synchronizing content on multiple devices.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
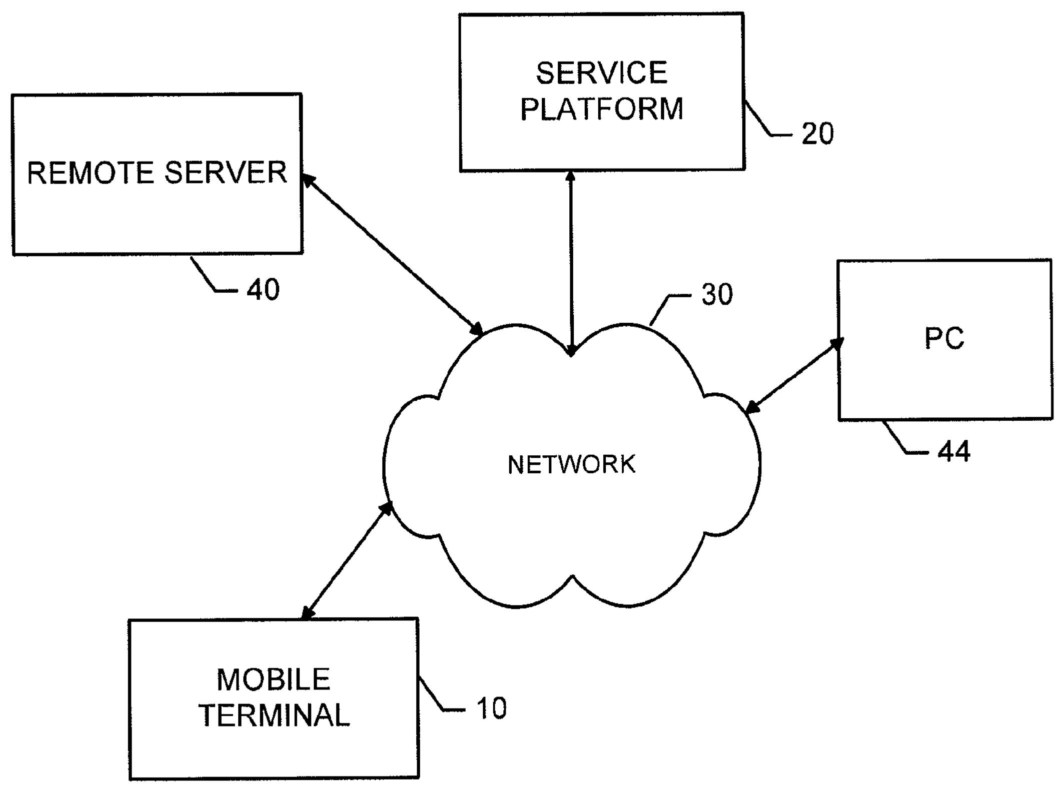
FIG. 1 is a schematic block diagram of a system according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

As indicated above, synchronization of data has become more important with the proliferation of electronic devices that are capable of generating, modifying and/or consuming content. Thus, content may be created, copied, modified and distributed in various versions and management of the versions may be important to, for example, ensure that only the latest or best version is published or available at any given time. In some instances, users desire for the same content to be accessible via different devices. For example, a user may personally own multiple devices (e.g., a media player, a mobile telephone, a laptop computer or PC, and/or others) via which the user would like to be able to access particular content. Alternatively, the user may wish to share the particular content with users of other devices of friends (e.g., in a social network setting) or colleagues (e.g., in a corporate or enterprise network setting). In such situations, it may be desirable for any changes made to the particular content at one device to be synchronized with versions of the particular content that may be stored at the other devices or at a location (e.g., a central location such as a server) accessible to the other devices. As yet another example, for files that are collaboratively edited by a plurality of users, it may be desirable for changes proposed by any one of the users to be reflected at the devices of the other users or at a server, via synchronization.

Some embodiments of the present invention provide a mechanism by which synchronization of content may be accomplished. However, since synchronization accomplished on a file level may consume relatively large amounts of resources, embodiments of the present invention provide a mechanism by which synchronization may be accomplished on a sub-file level. For example, a video file of a few minutes in length may easily consume 100 megabytes of space. Accordingly, in some situations, only portions of a file, instead of the entire file, may be synchronized when changes are made to certain identifiable portions of the file. For example, only the changed portions of the mentioned video file may be synchronized, limiting the need for synchronization to a few megabytes. Editing video data has recently become feasible on the mobile terminal where the video has been captured or otherwise acquired. The user may, for example, add titles, transition effects or make edits that shorten the duration of the video clips. In such a case, the video data remains mostly unchanged, but some additional information is added to the data (e.g. title, transition or clipping). Synchronizing this information only and making the video available e.g. through on-line sharing such as Share on Ovi is faster than transferring the whole video over when only small changes have been done.

FIG. 1 illustrates a block diagram of a system that may benefit from embodiments of the present invention. It should be understood, however, that the system as illustrated and hereinafter described is merely illustrative of one system that may benefit from embodiments of the present invention and, therefore, should not be taken to limit the scope of embodiments of the present invention. As shown in FIG. 1, an embodiment of a system in accordance with an example embodiment of the present invention may include a mobile terminal 10 capable of communication with numerous other devices including, for example, a service platform 20 via a network 30. In some embodiments of the present invention, the system may further include one or more additional devices such as personal computers (PCs), servers, network hard disks, file storage servers, and/or the like (e.g., remote server 40, PC 44, and others), that are capable of communication with the mobile terminal 10 and accessible by the service platform 20. However, not all systems that employ embodiments of the present invention may comprise all the devices illustrated and/or described herein.

The mobile terminal 10 may be any of multiple types of mobile communication and/or computing devices such as, for example, portable digital assistants (PDAs), pagers, mobile televisions, mobile telephones, gaming devices, laptop computers, cameras, camera phones, video recorders, audio/video player, radio, GPS devices, or any combination of the aforementioned, and other types of voice and text communications systems, can readily employ embodiments of the present invention.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), e.g., the Internet. In turn, other devices such as processing elements (e.g., personal computers, server computers or the like) may be included in or coupled to the network 30. By directly or indirectly connecting the mobile terminal 10 and the other devices (e.g., service platform 20, remote server 40, PC 44, etc.) to the network 30, the mobile terminal 10 and/or the other devices may be enabled to communicate with each other, for example, according to numerous communication protocols including Hypertext Transfer Protocol (HTTP) and/or the like, to thereby carry out various communication or other functions of the mobile terminal 10 and the other devices, respectively. As such, the mobile terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity. Accordingly, home network users may conduct synchronization with respect to video files, photographic files and numerous other types of content that may commonly be transferred to a media hub within a home environment. The network 30 may also be a car information network that comprises a storage such as a hard disk or solid state device and one or more playback devices.

In an example embodiment, the service platform 20 may be a device or node such as a server or other processing element. The service platform 20 may have any number of functions or associations with various services. As such, for example, the service platform 20 may be a platform such as a dedicated server (or server bank) associated with a particular information source or service (e.g., Nokia's Ovi service), or the service platform 20 may be a backend server associated with one or more other functions or services. As such, the service platform 20 represents a potential host for a plurality of different services or information sources. In some embodiments, the functionality of the service platform 20 is provided by hardware and/or software components configured to operate in accordance with known techniques for the provision of information to users of communication devices. However, at least some of the functionality provided by the service platform 20 may be data processing and/or service provision functionality provided in accordance with embodiments of the present invention.

In some cases, the service platform 20 may represent a plurality of different services or information sources. As such, for example, other devices like the remote server 40 may be included within the service platform 20 in some cases. Indeed, the devices shown in FIG. 1 are provided merely to illustrate a few examples of the diversity of available devices that may employ embodiments of the present invention.

Synchronization of data may, in some situations, be categorized as relating to database synchronization or file system synchronization. In database synchronization, databases or data structures that share similar fields or structures may be synchronized. In this regard, since the structures of the databases being synchronized are similar (e.g., corresponding elements in each structure are similar), specific changed portions of the databases could potentially be updated merely by pointing to the field or record in one database that should be updated based on the corresponding field or record of the other database. As such, for example, a database associated with the remote server 40 or the service platform 20 may be synchronized with another database (which could be a standalone database or could be embodied at the PC 44 or another device) via database synchronization using a common understanding of the shared structure that pre-exists prior to synchronization.

Meanwhile, in a file systems context, devices may generally lack knowledge of structure prior to synchronization due to such common structure not existing. Although files may have formats that are recognizable on each respective device, the content on each of the devices (e.g., documents, video files, Excel spreadsheets, etc.) may have different paragraphs, pages, sections, frames, sheets, or other structural components. Accordingly, in a file system context, synchronization of less than an entire file may be challenging. Exemplary embodiments of the present invention provide examples of mechanisms that may be employed to address this challenge. In this regard, for example, some embodiments of the present invention provide a mechanism by which enablement is provided for file mapping on a sub-file level. Accordingly, structural information about files may be provided to enable synchronization with respect to applicable portions of the structure instead of synchronizing entire files.

In an exemplary embodiment, an apparatus 50 is provided that may be employed at devices performing synchronization according to exemplary embodiments of the present invention. The apparatus 50 may be employed, for example, by the mobile terminal 10 or PC 44 acting as a client device synchronizing in a file systems context with the remote server 40 or the service platform 20 acting as a serving device. However, embodiments may also be embodied on a plurality of other devices. Instances of the apparatus 50 may be embodied on both client side and server side devices. Thus, the apparatus 50 will be described in generic terms so as to have broad application to either client side or server side devices, As such, the apparatus 50 of FIG. 2 is merely an example and may include more, or in some cases less, than the components shown in FIG. 2.

Figure 2:
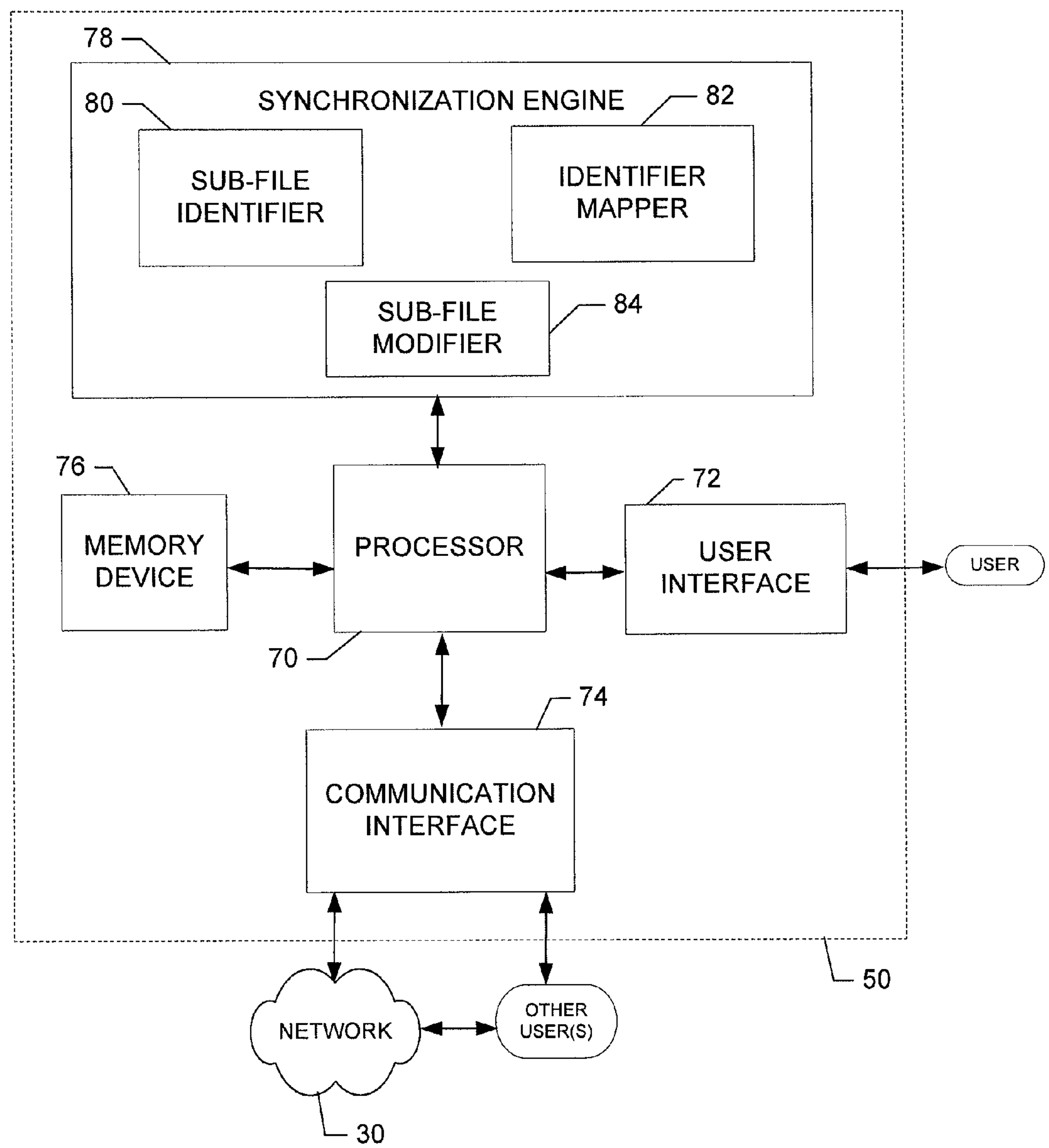
FIG. 2 is a schematic block diagram of an apparatus for providing sub-file level synchronization according to an exemplary embodiment of the present invention.

Referring now to FIG. 2, an apparatus for employing sub-file level synchronization is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases or storage locations that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as Bluetooth, Infrared, UWB, WiFi, and/or the like, which are being increasingly employed in connection with providing home connectivity solutions.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

In an exemplary embodiment, the processor 70 may be embodied as, include or otherwise control a synchronization engine 78. The synchronization engine 78, according to some embodiments, is any means such as a device or circuitry embodied in hardware, software or a combination of hardware and software that is configured to perform synchronization functions with respect to files of a device associated with the synchronization engine 78. In this regard, for example, the synchronization engine 78 is configured to identify files to be synchronized (e.g., by identifying files for which differences exist between a file version at the device and a file version at another location). As such, the synchronization engine 78 may be configured to compare an identifier of a particular file of the device with identifiers of files at the other location to determine if a file corresponding to the particular file exists at the other location and, if the file exists, determine whether differences exist between the particular file and the corresponding file. In a simple form, a change in a file may be detected by comparing the modification date of the file and the time of previous synchronization. In some cases, determinations regarding file changes may be accomplished using a change log such that a change in a file after a previous synchronization is indicated in the change log and triggers a synchronization of the corresponding file. As an alternative, server and client files may be compared to each other either wholly or by using a hash. If differences are determined to exist, the synchronization engine 78 may be configured to synchronize the particular file with the corresponding file (e.g., by updating one file in its entirety to match the other file).

In accordance with embodiments of the present invention, rather than merely synchronizing files on the file level (e.g., by sending a complete copy of an updated file to another device to achieve synchronization with respect to a corresponding older version of the file at the other device), the synchronization engine 78 is configured to enable synchronization at the sub-file level. In an exemplary embodiment, the synchronization engine 78 may include or be in communication with additional devices, components, modules or elements to enable sub-file level synchronization as described herein. In this regard, for example, in one embodiment the synchronization engine 78 includes a sub-file identifier 80, an identifier mapper 82 and a sub-file modifier 84. The sub-file identifier 80, the identifier mapper 82 and the sub-file modifier 84 may provide extensions to the synchronization engine's capabilities in relation to defining portions of files for which changes have been made, mapping file information on a sub-file level for use in synchronization, and enabling synchronization on a portioned basis instead of a whole file basis, respectively.

Accordingly, in an exemplary embodiment, the synchronization engine 78 (or the processor 70) may be embodied as, include or otherwise control the sub-file identifier 80, the identifier mapper 82 and the sub-file modifier 84. The sub-file identifier 80, the identifier mapper 82 and the sub-file modifier 84 may each be any means such as a device or circuitry embodied in hardware, software or a combination of hardware and software (e.g., processor 70 operating under software control, the processor 70 embodied as an ASIC or FPGA specifically configured to perform the operations described herein, or a combination thereof) that is configured to perform the corresponding functions of the sub-file identifier 80, the identifier mapper 82 and the sub-file modifier 84, respectively, as described below.

In an exemplary embodiment, any or all of the sub-file identifier 80, the identifier mapper 82 and the sub-file modifier 84 may include instructions, code, modules, applications and/or circuitry for providing respective portions of sub-file level synchronization services. However, it should be noted that code, circuitry and/or instructions associated with the sub-file identifier 80, the identifier mapper 82 and the sub-file modifier 84 need not necessarily be modular. In some embodiments, communication between the synchronization engine 78, the sub-file identifier 80, the identifier mapper 82 and the sub-file modifier 84 is conducted via the processor 70. However, the synchronization engine 78, the sub-file identifier 80, the identifier mapper 82 and the sub-file modifier 84 are alternatively in direct communication with each other.

The sub-file identifier 80 may be configured to provide for identification of content items in a file system context at the sub-file level. In this regard, for example, the sub-file identifier 80 may be an extension to the synchronization engine 78 that enables the synchronization engine 78 to further identify a portion of the content item (e.g., a section, element, page, slide, paragraph, frame, object or other part within the content item) in which a change has occurred. In some cases, the synchronization engine 78 (e.g., if the synchronization engine employs SyncML) is configured to assign an identifier to a file in which the identifier is used to indicate whether changes are made to the file for synchronization determinations. For example, the identifier NNN (e.g., a sequence of any number of characters uniquely identifying the file) may be assigned to a particular file to identify the file. Meanwhile, at another device a corresponding identifier may be provided for a file that corresponds to the particular file. The synchronization engine 78 may store a mapping of the identifiers. In response to a change being made to the particular file, the sub-file identifier 80 according to an exemplary embodiment is configured to provide a file identifier that includes an extension to the identifier (e.g., a sub-file identification) to indicate the corresponding portion of the particular file that was changed. Thus, for example, the extension provided by the sub-file identifier 80 may take the form M in the sequence NNN.M, where M represents a character or sequence of characters (e.g., defined as the sub-file identification or sub-file ID) that uniquely identifies the portion of the file that was changed.

In an exemplary embodiment, the sub-file identifier 80 may be triggered to initiate generation of sub-file identification in response to a change being made to the file. Thus, in some cases, the sub-file identifier 80 only operates in response to file changes. In this regard, for example, the addition of a new section to the particular file and/or the modification of sections of the particular file (including changes, replacements, deletions, restorations, and/or the like) may trigger assignment of a sub-file identification (or an updated sub-file ID) to the particular file. As such, for example, the sub-file ID may only be assigned when needed to indicate that a section of the particular file has been changed.

As an example, if a particular section (e.g., a section entitled "Summary") of a file named "My Document.doc" is modified, the sub-file identifier 80 may generate a sub-file ID corresponding to the particular section to indicate that the "Summary" section has been changed. The sub-file ID may then be associated with the file identifier of the file. The sub-file ID, by virtue of indicating that the particular section of the file has changed, may indicate that synchronization need not be performed with respect to the entirety of the file, but instead synchronization may be limited to the particular portion. In some cases, if multiple portions are changed, use of a sub-file ID to identify each changed portion may enable synchronization to be conducted in relation to each identified portion instead of for the entirety of the file.

As an alternative, the sub-file ID may be used to indicate a particular group of sections (e.g., multiple sections of a particular level) rather than a single and specific section. Thus, for example, the sub-file ID from the example above for changes to the "Summary" section of the "My Document.doc" file may indicate that sections on the same level as the "Summary" section, or some other reasonably sized, or logically related group of sections including the "Summary" section. Level based sub-file ID sections may include for example, tables, pictures, embedded objects or other specific classes or types of sections within a file. In situations in which changes are made to multiple sections that do not fall within the same level, some embodiments may provide for the recording of multiple sub-file IDs for each changed section. Thus, synchronization may be accomplished with respect to each section independently.

Section identification may be performed in any suitable manner that enables unique identification of the corresponding section. In some cases, inherent characteristics of a particular file format may provide natural boundaries or clues for section differentiation. For example, in an Excel workbook, all of the worksheets and all of the cells are uniquely identifiable. Similarly, in video or music files, the sections typically have a running number of some kind. As an example, H.264 video provides for "sub-sequences" and other video formats provide for groups of pictures (GOP) that may be independently decodable and present candidates for sub-file differentiation. For word documents and other text files, paragraphs, pages, headings, titles, tables, object identifiers, markers or other like features may provide format based features upon which section differentiation may be performed.

The identifier mapper 82 of an exemplary embodiment is configured to map files (e.g., via relating corresponding identifiers to each other) to each other if such files are related. As such, for example, the identifier mapper 82 may be configured to enable determinations regarding which files to update during a synchronization operation by the synchronization engine 78. In this regard, for example, the identifier mapper 82 is configured to handle providing information to and/or receiving information from an identifier mapper of an instance of the synchronization engine at another device with which the apparatus 50 is attempting to synchronize. When providing information to another synchronization engine, the identifier mapper 82 may provide the file identifier and sub-file ID (if any) to the other synchronization engine to enable a mapping of the content item corresponding to the provided file identifier and sub-file ID to a corresponding file identifier and sub-file ID at the other synchronization engine. Of note, the file identifiers at each end need not be identical, since the mapping of the file identifiers used at each respective end enables association of the content items to each other regardless of the file identifiers used. However, according to an exemplary embodiment, the sub-file ID generated at one end and provided to another synchronization engine is retained for use at the receiving end.

Accordingly, in some embodiments, the identifier mapper 82 enables sub-file level determinations regarding synchronization needs on a file by file basis. In other words, for example, when a synchronization operation is conducted, the identifier mapper 82 of one device (e.g., a client device) provides identifier information to the synchronization engine 78 which may then provide information identifying changed files to the device with which synchronization is being conducted (e.g., a server). The identifier mapper of the server device may then check mappings of identifiers stored to identify the corresponding content items or files associated with the provided information to enable the synchronization engine 78 to make a determination as to whether synchronization is to be performed for particular parts of such content items or files (e.g., based on whether the sub-file IDs match for files having file identifiers that map to each other. Synchronization may then take place between the client and server for content items (or portions of content items) identified as needing synchronization and the identifier mappers of the respective devices may be updated correspondingly.

As indicated above, the synchronization engine 78 may be configured to conduct synchronization of files by providing a copy of a changed file to a device with which synchronization is being conducted via known methods. However, as an extension to known methods of synchronization involving whole files, embodiments of the present invention enable sub-file level synchronization such that only a particular portion of a file that has been changed may be sent during the synchronization process to reduce resource consumption. In an exemplary embodiment, the ability to modify individual sections of a file, rather than just the whole file, may be provided by the sub-file modifier 84. As such, in some cases, the sub-file modifier 84 acts as an adapter for each type or class of file (e.g., Word document, Excel spreadsheet, etc.) to provide enablement for replacing sections of the respective files. In this regard, for example, the sub-file modifier 84 may include a plurality of format-specific descriptions of structural features for each type or class of file to enable changes to portions of files in reference to the structural features. Thus, as an example, sections of a word processing document, pages of a presentation, cell ranges of a spreadsheet document, independent video sections, scalability layers of video or audio files, parts of a song, and other structurally distinguishable portions of various kinds of files or content items may be added to, subtracted from, replaced or otherwise modified by the sub-file modifier 84. In some cases, the sub-file modifier 84 may comprise a decoder and/or an encoder for decoding and encoding video, music or audio data or data compressed in other ways. If, for some reason, sub-file synchronization fails or is not executable, the synchronization engine 78 may still conduct whole file synchronization as a backup.

In an exemplary embodiment, the sub-file modifier 84 may also include a mapping of sub-file IDs to corresponding elements in files or content items. In other words, based on the format-specific descriptions of structural features for each type or class of file, a mapping may be provided of sub-file IDs to the respective elements. As such, the sub-file modifier 84 may map a particular sub-file ID M to a corresponding paragraph, page, cell range, video section or other structural feature. When synchronizing with another device, information related to mapping of sub-file IDs to corresponding elements in files or content items may be exchanged to ensure agreement at both sides with respect to the particular file or type of file with respect to which synchronization is being conducted. Alternatively, the information related to mapping of sub-file IDs to corresponding elements in files or content items may be constructed by each sub-file modifier 84 based on predetermined rules or standards for relating sub-file IDs to corresponding elements so that no information regarding mappings may need to be exchanged. In some exemplary embodiments, files other than text files typically include structural elements or features that can be assigned corresponding identifiers. Meanwhile, for text files, one exemplary solution may involve the assignment of identifiers to particular passages of text or locations inside the file (e.g., "after the words NNN NNN NNN, at byte position 2158"). Another exemplary solution may involve the assignment of identifiers to page numbers.

Figure 3:
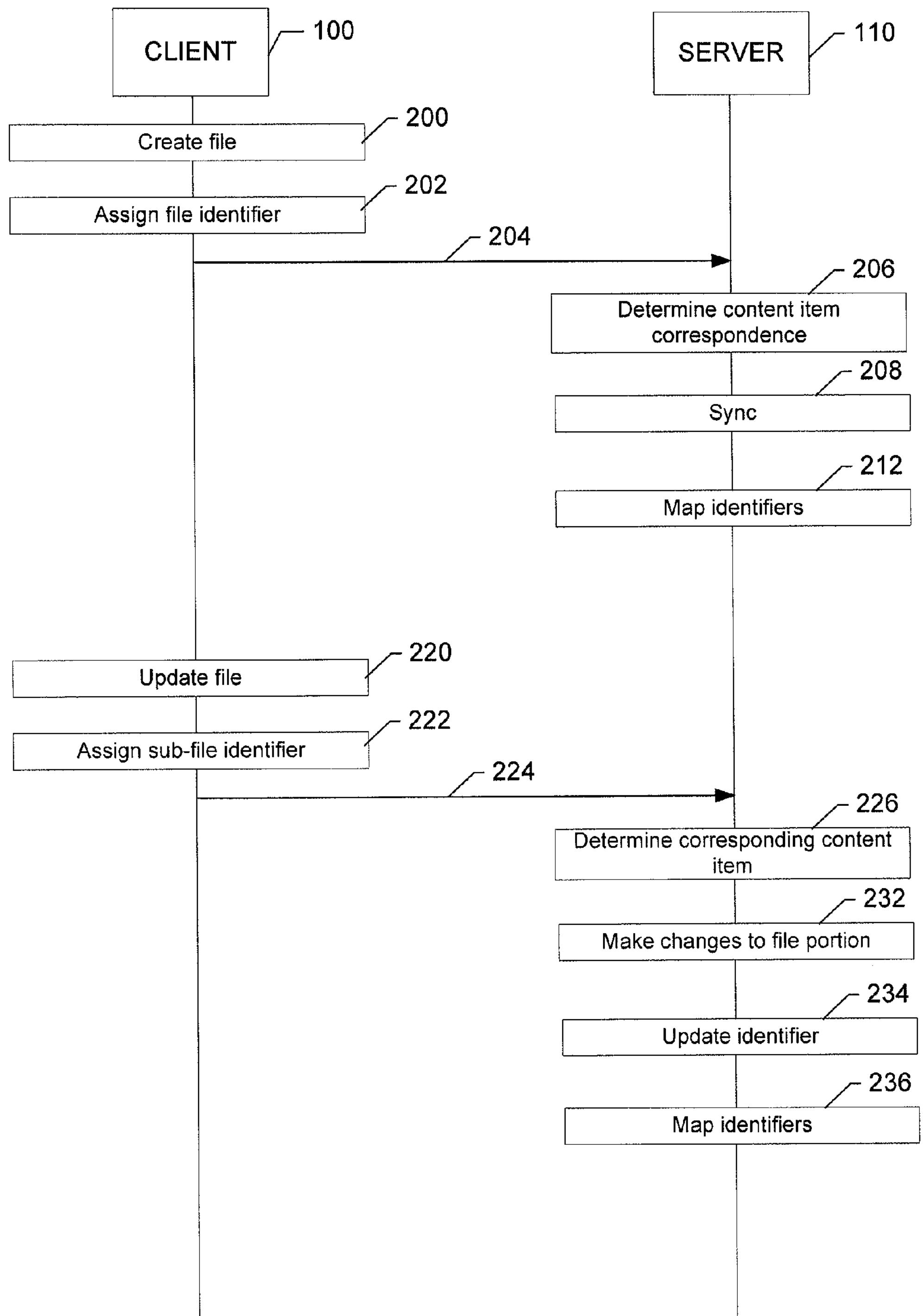
FIG. 3 is a control flow diagram showing examples of communications that may be exchanged between a client and a server during synchronization operations according to an exemplary embodiment.

An example of a series of synchronization operations between two devices (e.g., a client 100 and a server 110) according to an embodiment of the present invention is provided in FIG. 3. In this regard, FIG. 3 is a flow diagram showing an example of communications that may be exchanged between the client 100 and the server 110 during synchronization operations according to an exemplary embodiment. It should be noted that although FIG. 3 generally represents communications as passing between the client 100 and the server 110, such communications may be conducted via respective instances of the synchronization engine 78 at each of the client 100 and the server 110.

In an exemplary embodiment, the client 100 may initially create a file at operation 200. The file may be, for example, a file created in an Excel workbook. An instance of the synchronization engine 78 at the client 100 may generate a file identifier (e.g., ID117) that may be stored in association with the created file at operation 202. In response to a synchronization operation, the client 100 may provide the file identifier ID117 along with a full copy of the created file to the server 110 at operation 204. An instance of the synchronization engine 78 at the server 110 may check a local mapping of file identifiers to determine whether a corresponding content item exists for the file identifier ID117 at operation 206. In this case, since the created file is new, no corresponding content item exists, and the server 110 may store the copy of the created file at operation 208. The server 110 may assign a local file identifier (e.g., ID123) to the created file and map the file identifier ID117 used at the client 100 to the local file identifier ID123 at operation 212. In some cases, the server 110 may communicate its local file identifier to the client 100 to enable the client 100 to also map the related file identifiers (not shown).

At some later time, the client may update the file at operation 220. The update may include changes made in connection with a particular portion of the file (e.g., changes to sheet 1). The client 100 may then assign a sub-file ID to the file identifier ID117 to create a new identifier including both the file identifier and the sub-file ID at operation 222. In this example, the new identifier may be ID117.SID001, where SID001 is a unique identifier corresponding to the change made to a specific section of the file. In some cases, an indication of the portion of the file updated or file location corresponding to the change may also be provided (e.g., ID117.SID001:Sheet1). During a subsequent synchronization operation, the client 100 may communicate the new identifier and the corresponding file location to the server 110 (e.g., by sending ID117.SID001:Sheet1) along with providing the changed portion of the file (e.g., sheet 1) to the server 110 at operation 224. An instance of the synchronization engine 78 at the server 110 (e.g., more specifically the identifier mapper 82) may check a local mapping of file identifiers to determine whether a corresponding content item exists for the file identifier ID117 at operation 226. In this case, the server 110 may determine that ID117 is mapped to local file identifier ID123. In response to receiving the updated portion of the file and identifying the corresponding local file, the server 110 may make corresponding changes to sheet 1 at operation 232. At operation 234, the server 110 may then alter the local file identifier to account for the sub-file modification by changing the file identifier to "ID123:SIDOO1:Sheet1", which may be mapped to the identifier used at the client end (e.g., ID117.SID001:Sheet1) at operation 236. In some cases, the server 110 may communicate its updated local file identifier to the client 100 to enable the client 100 to also map the related file identifiers (not shown). However, in alternative embodiments, mapping of identifiers used at both the client and server side may only be maintained at the server 110.

During subsequent synchronization operations, new sub-file IDs may be generated at the client end for each respective portion of the file corresponding to file identifier ID117 that is changed. The changed file portion and the corresponding file identifier may then be communicated to the server 110 according to the sequence described above. After each instance of synchronization, the sub-file IDs may be mapped to ensure an updated mapping as also indicated above.

Figure 4:
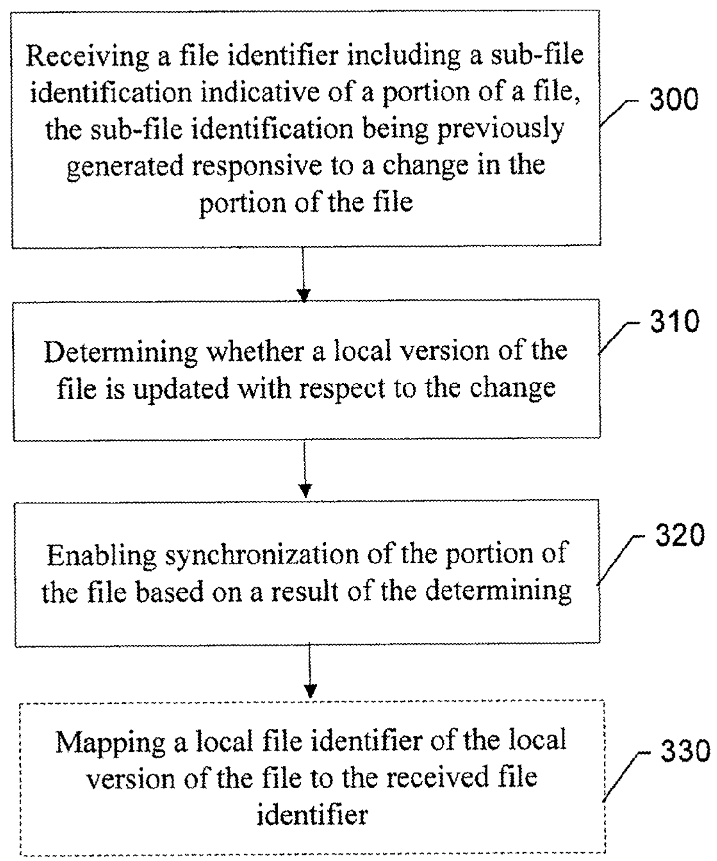
FIG. 4 is a flowchart according to an exemplary method for providing sub-file level synchronization according to an exemplary embodiment of the present invention.
Figure 5:
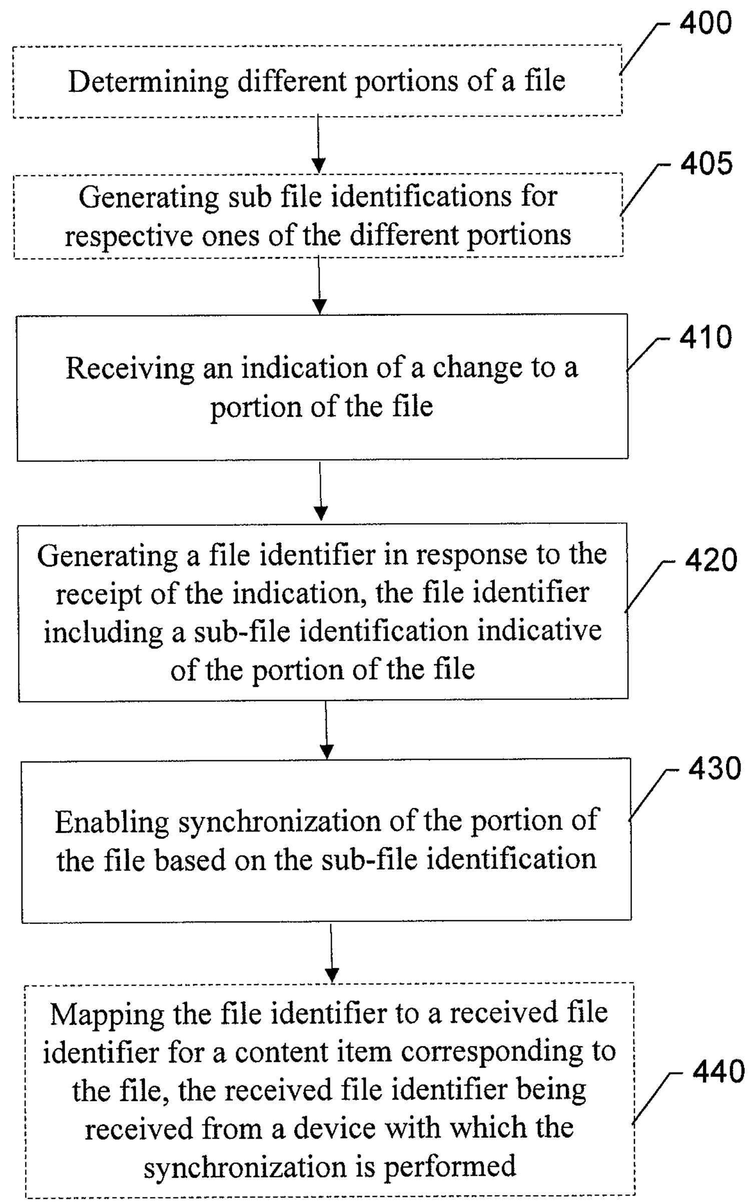
FIG. 5 is a flowchart according to another exemplary method for providing sub-file level synchronization according to an exemplary embodiment of the present invention.

FIGS. 4 and 5 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a built-in processor (e.g., the processor 70). As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). In some embodiments, the computer program instructions are stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing sub-file level synchronization as provided in FIG. 4 may include operation 300 of receiving a file identifier including a sub-file identification indicative of a portion of a file in which the sub-file identification is previously generated responsive to a change in the portion of the file. The method may further include determining whether a local version of the file is updated with respect to the change at operation 310 and enabling synchronization of the portion of the file based on a result of the determining at operation 320.

In some embodiments, the method may include further optional operations, an example of which is shown in dashed lines in FIG. 4. Optional operations may be performed in any order and/or in combination with each other in various alternative embodiments. As such, the method may further include mapping a local file identifier of the local version of the file to the received file identifier at operation 330.

In some embodiments, certain ones of the operations above may be modified or further amplified as described below. It should be appreciated that each of the modifications or amplifications below may be included with the operations above either alone or in combination with any others among the features described herein. In this regard, for example, mapping the local file identifier to the received file identifier may include updating the mapping to include the received sub-file identifier as a portion of each of the local file identifier and the received file identifier.

In an exemplary embodiment, an apparatus for performing the method of FIG. 4 above may comprise a processor (e.g., the processor 70) configured to perform some or each of the operations (300-330) described above. The processor may, for example, be configured to perform the operations (300-330) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-330 may comprise, for example, the processor 70, the synchronization engine 78 (as modified by the extensions provided via the sub-file identifier 80, the identifier mapper 82 and the sub-file modifier 84), and/or an algorithm executed by the processor 70 for processing information as described above.

In an alternative embodiment of a method for providing sub-file level synchronization as provided in FIG. 5, the method may include operation 410 of receiving an indication of a change to a portion of a file. This receiving may happen from another software or hardware module or from the same hardware or software module. The indication may be a time stamp when the file has been modified, or it may comprise information on the changes, or both. Generally, the indication may be any data that is useful in determining that at least a portion of the file may need to be synchronized. The method may further include generating a file identifier in response to the receipt of the indication, the file identifier including a sub-file identification indicative of the portion of the file at operation 420 and enabling synchronization of the portion of the file based on the sub-file identification at operation 430.

In some embodiments, the method may include further optional operations, an example of which is shown in dashed lines in FIG. 5. Optional operations may be performed in any order and/or in combination with each other in various alternative embodiments. As such, the method may further include mapping the file identifier to a received file identifier for a content item corresponding to the file in which the received file identifier is received from a device with which the synchronization is performed at operation 440. In some embodiments, the sub-file identification may actually be initially performed prior to any changes being made to the file. In other words, the sub-file identification may be performed in a preemptive manner. In such cases, when changes are made to a particular file portion, synchronization may be initiated by identifying the corresponding sub-file identification and sending the corresponding portion to the device with which synchronization is being conducted. New sections added may be provided with corresponding new sub-file identifications. Thus, for example, in some cases, the method may include optional initial operations of determining different portions of the file prior to receiving the indication at operation 400 and generating sub file identifications for respective ones of the different portions at operation 405. The created sub-file identifications may be stored until needed or may be communicated to devices with which synchronization operations may be conducted in the future in advance.

In some embodiments, certain ones of the operations above may be modified or further amplified as described below. It should be appreciated that each of the modifications or amplifications below may be included with the operations above either alone or in combination with any others among the features described herein. In this regard, for example, enabling synchronization may include providing the file identifier and the portion of the file to a device with which synchronization is to be conducted. In some cases, generating the file identifier may include generating the sub-file identification based on structural features corresponding to the portion of the file having the change.

In an exemplary embodiment, an apparatus for performing the method of FIG. 5 above may comprise a processor (e.g., the processor 70) configured to perform some or each of the operations (400-440) described above. The processor may, for example, be configured to perform the operations (400-440) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-440 may comprise, for example, the processor 70, the synchronization engine 78 (as modified by the extensions provided via the sub-file identifier 80, the identifier mapper 82 and the sub-file modifier 84), and/or an algorithm executed by the processor 70 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving an indication of a change to a portion of a file;

generating, at a device capable of storing files, a file identifier in response to the receipt of the indication, the file identifier including an identification of the file as a respective type of file format and a sub-file identification indicative of the portion of the file, wherein generating the file identifier comprises generating the sub-file identification that is based on a format-specific description of structural features of the respective type of file format and that corresponds to the portion of the file having the change; and enabling synchronization of the portion of the file based on the sub-file identification.

2. The method of claim 1, wherein enabling synchronization comprises providing the file identifier and providing the portion of the file to a device with which synchronization is to be conducted.

3. The method of claim 1, further comprising mapping the file identifier to a received file identifier for a content item corresponding to the file, the received file identifier being received from a device with which the synchronization is performed.

4. The method of claim 3, wherein mapping the file identifier to the received file identifier comprises updating the mapping to include the sub-file identifier as a portion of each of the file identifier and the received file identifier.

5. The method of claim 1, further comprising determining different portions of the file and generating sub-file identifications for respective ones of the different portions prior to receiving the indication.

6. The method of claim 1, wherein generating the sub-file identifications further comprises communicating the sub-file identifications to the device with which the synchronization is to be conducted prior to receiving the indication.

7. The method of claim 1, wherein generating the sub-file identification comprises generating a level based sub-file identification that identifies all structural features of the file that are on a same level.

8. A computer program product comprising at least one non-transitory computer-readable storage medium having computer-executable program code instructions stored therein, the computer-executable program code instructions comprising:

program code instructions for receiving an indication of a change to a portion of a file;

program code instructions for generating a file identifier in response to the receipt of the indication, the file identifier including an identification of the file as respective type of file format and a sub-file identification indicative of the portion of the file, wherein the program code instructions for generating the file identifier comprise program code instructions for generating the sub-file identification that is based on a format-specific description of structural features of the respective type of file format at and that corresponds to the portion of the file having the change; and program code instructions for enabling synchronization of the portion of the file based on the sub-file identification.

9. The computer program product of claim 8, wherein program code instructions for enabling synchronization include instructions for providing the file identifier and providing the portion of the file to a device with which synchronization is to be conducted.

10. The computer program product of claim 8, wherein program code instructions for generating the file identifier include instructions for generating the sub-file identification based on structural features corresponding to the portion of the file having the change.

11. The computer program product of claim 8, further comprising program code instructions for mapping the file identifier to a received file identifier for a content item corresponding to the file, the received file identifier being received from a device with which the synchronization is performed.

12. The computer program product of claim 11, wherein program code instructions for mapping the file identifier to the received file identifier include instructions for updating the mapping to include the sub-file identifier as a portion of each of the file identifier and the received file identifier.

13. The computer program product of claim 8, further comprising program code instructions for determining different portions of the file and generating sub file identifications for respective ones of the different portions prior to receiving the indication.

14. The computer program product of claim 8, wherein program code instructions for generating the sub-file identifications include instructions for communicating the sub-file identifications to the device with which the synchronization is to be conducted prior to receiving the indication.

15. The computer program product of claim 8, wherein the program code instructions for generating the sub-file identification comprises program code instructions for generating a level based sub-file identification that identifies all structural features of the file that are on a same level.

16. An apparatus comprising a processor and a memory storing computer program code, wherein the memory and stored computer program code are configured, with the processor, to cause the apparatus to:

receive an indication of a change to a portion of a file;

generate a file identifier in response to the receipt of the indication, the file identifier including an identification of the file as a respective type of file format and a sub-file identification indicative of the portion of the file, wherein generation of the file identifier comprises generation of the sub-file identification that is based on a format-specific description of structural features of the respective type of file format and that corresponds to the portion of the file having the change; and enable synchronization of the portion of the file based on the sub-file identification.

17. The apparatus of claim 16, wherein the processor is configured to enable synchronization by providing the file identifier and providing the portion of the file to a device with which synchronization is to be conducted.

18. The apparatus of claim 16, wherein the processor is configured to generate the file identifier by generating the sub-file identification based on structural features corresponding to the portion of the file having the change.

19. The apparatus of claim 16, wherein the processor is further configured to map the file identifier to a received file identifier for a content item corresponding to the file, the received file identifier being received from a device with which the synchronization is performed.

20. The apparatus of claim 19, wherein the processor is configured to map the file identifier to the received file identifier by updating the mapping to include the sub-file identifier as a portion of each of the file identifier and the received file identifier.

21. The apparatus of claim 16, wherein the processor is further configured to determine different portions of the file and generate sub file identifications for respective ones of the different portions prior to receiving the indication.

22. The apparatus of claim 16, wherein the processor is configured to generate the sub-file identifications and further communicate the sub-file identifications to the device with which the synchronization is to be conducted prior to receiving the indication.

23. The apparatus of claim 16, wherein the memory and the stored computer program code are further configured, with the processor, to cause the apparatus to generate the sub-file identification by generating a level based sub-file identification that identifies all structural features of the file that are on a same level.

24. A method comprising:

receiving a file identifier including an identification of the file of a respective type of file format and a sub-file identification indicative of a portion of a file changed at another device, the file changed at the other device corresponding to a locally stored file, wherein receiving the file identifier comprises receiving the sub-file identification that is based on a format-specific description of structural features of the respective type of file format and that corresponds to the portion of the file having the change;

receiving the portion of the file changed at the other device; and enabling synchronization, at a device capable of storing files, of the locally stored file based on the received portion of the file changed.

25. The method of claim 24, further comprising mapping a local file identifier of the local version of the file to the received file identifier.

26. The method of claim 24, wherein receiving the sub-file identification comprises receiving a level based sub-file identification that identifies all structural features of the file that are on a same level.

27. A computer program product comprising at least one non-transitory computer-readable storage medium having computer-executable program code instructions stored therein, the computer-executable program code instructions comprising:

program code instructions for receiving a file identifier including an identification of the file of a respective type of file format and a sub-file identification indicative of a portion of a file changed at another device, the file changed at the other device corresponding to a locally stored file, wherein the program code instructions for receiving the file identifier comprise program code instructions for receiving the sub-file identification that is based on a format-specific description of structural features of the respective type of file format and that corresponds to the portion of the file having the change;

program code instructions for receiving the portion of the file changed at the other device; and program code instructions for enabling synchronization of the locally stored file based on the received portion of the file changed.

28. The computer program product of claim 27, further comprising program code instructions for mapping a local file identifier of the local version of the file to the received file identifier.

29. The computer program product of claim 27, wherein the program code instructions for receiving the sub-file identification comprises program code instructions for receiving a level based sub-file identification that identifies all structural features of the file that are on a same level.

30. An apparatus comprising a processor and a memory storing computer program code, wherein the memory and stored computer program code are configured, with the processor, to cause the apparatus to:

receive a file identifier including an identification of the file of a respective type of file format and a sub-file identification indicative of a portion of a file changed at another device, the file changed at the other device corresponding to a locally stored file, wherein receipt of the file identifier comprises receipt of the sub-file identification that is based on a format-specific description of structural features of the respective type of file format and that corresponds to the portion of the file having the change;

receive the portion of the file changed at the other device; and enable synchronization of the locally stored file based on the received portion of the file changed.

31. The apparatus of claim 30, wherein the processor is further configured to map a local file identifier of the local version of the file to the received file identifier.

32. The apparatus of claim 30, wherein the memory and the stored computer program code are further configured, with the processor, to cause the apparatus to receive the sub-file identification by receiving a level based sub-file identification that identifies all structural features of the file that are on a same level.

* * * * *

UNITED STATES PATENT AND TRADEMARK OFFICE

CERTIFICATE OF CORRECTION

PATENT NO. : 8,655,840 B2
APPLICATION NO. : 12/327507
DATED : February 18, 2014
INVENTOR(S) : Simelius It is certified that error appears in the above-identified patent and that said Letters Patent is hereby corrected as shown below:

In the claims:

Column 16,
Line 10, "file as respective" should read --file as a respective--;
Line 16, "file format at" should read --file format--.

Signed and Sealed this
Seventeenth Day of June, 2014

Michelle K. Lee
*Deputy Director of the United States Patent and Trademark Office*